(12) United States Patent
Sevo et al.

(10) Patent No.: US 10,568,176 B2
(45) Date of Patent: Feb. 18, 2020

(54) SPATIAL DIMMING

(71) Applicant: SIGNIFY HOLDING B.V., Eindhoven (NL)

(72) Inventors: Aleksandar Sevo, Eindhoven (NL); Bas Driesen, Eindhoven (NL); Bartel Marinus Van de Sluis, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/329,339

(22) PCT Filed: Aug. 1, 2017

(86) PCT No.: PCT/EP2017/069442
§ 371 (c)(1),
(2) Date: Feb. 28, 2019

(87) PCT Pub. No.: WO2018/041505
PCT Pub. Date: Mar. 8, 2018

(65) Prior Publication Data
US 2019/0254137 A1 Aug. 15, 2019

(30) Foreign Application Priority Data
Sep. 1, 2016 (EP) ..................... 16186740

(51) Int. Cl.
H05B 33/08 (2006.01)
H05B 37/02 (2006.01)

(52) U.S. Cl.
CPC ...... *H05B 33/0854* (2013.01); *H05B 33/0842* (2013.01); *H05B 37/0263* (2013.01); *H05B 37/0272* (2013.01); *H05B 33/0827* (2013.01)

(58) Field of Classification Search
CPC .............. F21Y 115/10; H05B 33/0842; H05B 37/0272; H05B 37/02; H05B 37/0245;
(Continued)

(56) References Cited

U.S. PATENT DOCUMENTS 6,948,823 B2 9/2005 Pohlert et al.
8,803,446 B2 * 8/2014 Masumoto ............. H05B 37/02
315/294

(Continued)

FOREIGN PATENT DOCUMENTS

| EP | 2779799 A2 | 9/2014 |
| WO | 2010035192 A1 | 4/2010 |
| WO | 2015075596 A2 | 5/2015 |

*Primary Examiner* — Vibol Tan
(74) *Attorney, Agent, or Firm* — Akarsh P. Belagodu

(57) ABSTRACT

An illumination source comprises an array of light-emitting elements for emitting illumination to illuminate an environment. A controller is arranged to control the illumination emitted by different ones of the light-emitting elements so as to form a spatial pattern, and to vary the spatial pattern according to a spatial dimming function whereby the spatial pattern is varied so as to emit a different overall intensity level as a function of a received dimming signal. A value is determined of at least one property relating to a manner in which the illumination source is deployed (e.g. the manner in which it is installed), and the spatial dimming function is set in dependence on the value of this property.

18 Claims, 7 Drawing Sheets

(58) Field of Classification Search
CPC ............ H05B 33/0845; H05B 37/0227; H05B 33/0848; H05B 33/0854; H05B 33/0827; H05B 33/0869; H05B 33/0872; H05B 33/0896; H05B 37/0218; H05B 37/0281; F21K 9/238

See application file for complete search history.

(56) References Cited

U.S. PATENT DOCUMENTS

| | | | | |
|---|---|---|---|---|
| 9,239,148 B2* | 1/2016 | Holt | ........................ | F21V 14/02 |
| 9,562,676 B2* | 2/2017 | Holt | .................... | H05B 33/0842 |
| 9,635,737 B2* | 4/2017 | Bosua | ................ | H05B 33/0845 |
| 9,883,563 B2* | 1/2018 | Bosua | ................ | H05B 33/0845 |
| 2007/0160373 A1* | 7/2007 | Biegelsen | .......... | H05B 37/0245 |
| | | | | 398/118 |
| 2015/0084513 A1 | 3/2015 | Anthony et al. | | |
| 2015/0146424 A1* | 5/2015 | Karg | ....................... | F21V 5/007 |
| | | | | 362/240 |
| 2015/0342006 A1 | 11/2015 | Bosua et al. | | |
| 2016/0074620 A1 | 3/2016 | Toda et al. | | |
| 2016/0234899 A1* | 8/2016 | Reed | .................. | H05B 33/0827 |
| 2018/0172227 A1* | 6/2018 | Soler | .................... | F21V 7/0033 |

* cited by examiner

SPATIAL DIMMING

CROSS-REFERENCE TO PRIOR APPLICATIONS

This application is the U.S. National Phase application under 35 U.S.C. § 371 of International Application No. PCT/EP2017/069442, filed on Aug. 1, 2017, which claims the benefit of European Patent Application No. 16186740.3, filed on Sep. 1, 2016. These applications are hereby incorporated by reference herein.

TECHNICAL FIELD

The present disclosure relates to spatial dimming of an illumination source, wherein the illumination source comprises an array of light-emitting elements (e.g. LEDs) and dimming is achieved at least in part by varying the spatial pattern formed by the illumination from the different light-emitting elements within the array.

BACKGROUND

Many modern illumination sources are dimmed by means of a digital dimming signal as the input signal controlling the dim level, rather than by a traditional analogue signal from a potentiometer or the like. The digital dimming signal may for example originate from an automated lighting controller, or from a manual user input entered through a suitable user input device such as a digital wall switch or wall panel or a lighting control app running on a user terminal such as a tablet, smartphone or smart watch. For instance, a lighting controller may be configured to automatically control the illumination level to increase gradually from zero or a very low level up to the maximum or at least a higher level, starting from and/or ending at a certain user defined time. If the light source is located in the bedroom, this can be used to provide the user with a wake-up lighting effect that wakes the user up gradually, in a more natural way than the abrupt wake-up experience of a traditional audio alarm.

In general an illumination source may comprise a single light-emitting element whose output intensity can be varied, or an array of individually-addressable light-emitting elements whose output intensities can each be varied individually. The light-emitting element (or each light-emitting element) may take any of a variety of possible forms, such as an LED or cluster of LEDs, a filament bulb, or a fluorescent tube. For example the illumination source may take the form of an LED-based lamp comprising either (I) a set of LEDs that can only be controlled together as a whole (as a single light-emitting element), or (II) a "pixelated" array of LEDs or subgroups of LEDs which can be controlled individually. In the case of a single or a given light-emitting element, the output intensity level can be varied by varying the current through the light-emitting element, and/or by means of pulse width modulation (PWM) whereby the length of a periodic pulse is varied so as to vary the average current over multiple periods.

If the digital dimming signal is n bits in length, this means there are $2^n$ possible output intensity levels that can be represented in the input. As the input dimming signal varies over the $2^n$ different values, a digital controller controls a driver to convert the $2^n$ digital values into $2^n$ different output levels in the intensity of the illumination emitted by the illumination source, e.g. by varying the current or PWM duty cycle. However, the ability of the illumination source to render $2^n$ different illumination values might be limited by the nature of the light-emitting element(s), the driver circuitry, and/or one or more other components of the illumination source, or a combined effect of two or more of these. If the degree of imprecision due to such factors is greater than the digital step-size in the input dimming signal, then the illumination source will be unable to usefully realize as many levels as the input signal can represent. Put another way, the resolution of the illumination source itself may be equivalent to less than n bits. Hence either the illumination source cannot render the step size of the digital dimming signal, or else the number of bits n in the digital dimming signal is simply designed to be no greater than the equivalent bit-resolution of the illumination source.

One effect of the above is that the lowest achievable dimming level may be relatively high. This can be especially problematic given that humans experience light intensity on a logarithmic scale, and are therefore more sensitive to a given step size at a low light level compared to their sensitivity to the same step size at a higher light level. Particularly, the user will be very sensitive to the first step between zero (no illumination) and the first non-zero dimming level. This can be problematic for instance if the illumination is being used to provide gradual wake-up lighting, because, if the resolution is too coarse, then the first step between zero and the first non-zero illumination level may cause the user to wake suddenly instead of gradually, thus obviating the intended effect.

To address the issue of reducing the lowest non-zero dimming level, U.S. Pat. No. 8,803,446 discloses a spatial dimming technique whereby the individually-controllable light-emitting elements of an array are controlled to emit in a spatial pattern that varies as a function of a dimming ratio indicated in the input dimming signal. According to U.S. '446, a dimming control unit is configured so as, when the dimming ratio falls within a first dimming range, to vary the power supply to the light source in accordance with the dimming ratio; but when the dimming ratio falls in a second dimming range, to vary the number of light-emitting elements that are lit.

By making use of spatial dimming, it is possible to achieve "deep dimming" whereby finer steps in the overall emitted illumination level are achievable, including a smaller step size between zero (no illumination output) and the lowest no-zero illumination output level.

SUMMARY

However, in U.S. '446 the spatial dimming function is fixed, i.e. the spatial pattern always varies as the same function of the dimming signal regardless of circumstances. The inventors of the present invention on the other hand have recognized that the most appropriate spatial dimming function may depend on the circumstances in which the illumination source is disposed in the environment (e.g. how it is installed). For instance, the spatial dimming function most suited to a luminaire installed next to a wall may be different than the spatial dimming most suited to a luminaire installed in the centre of a room. Or as another example, a lamp installed behind a diffuser or lampshade may be better served by a different spatial dimming function than a lamp that is exposed to the environment or behind a transparent casing.

Hence according to one aspect disclosed herein, there is provided a method of controlling an illumination source comprising an array of light-emitting elements for emitting illumination to illuminate an environment (e.g. each of the light-emitting elements comprising a LED or a subgroup of LEDs); wherein the method comprises: (A) arranging a controller to control the illumination emitted by different ones of the light-emitting elements so as to form a spatial pattern, and to vary the spatial pattern according to a spatial dimming function whereby the spatial pattern is varied so as to emit a different overall intensity level as a function of a received dimming signal; (B) determining a value of at least one property relating to a manner in which the illumination source is disposed in said environment (e.g. a manner in which it is installed); and (C) setting the spatial dimming function in dependence on the value of said property.

In embodiments, the determining of the value of said property may comprise automatically detecting the value using at least one sensor. Alternatively the determining of the value of said property may comprise receiving a user input indicative of the value.

In embodiments, the illumination source may take the form of a lamp for installation into a luminaire, and said property may comprise a position and/or orientation of the lamp within the luminaire. E.g. the luminaire may comprise a reflector and said property may comprise the position and/or orientation of the lamp relative to the reflector.

In embodiments, said property may comprise a location and/or orientation of the illumination source within the environment. For instance the environment may comprise a room and said property may comprise the location and/or orientation of the illumination source within the room. E.g. the property may comprise the position and/or orientation relative to one or more walls of the room. Or as an alternative example said property may comprise the position and/or orientation relative to another reference point or framework, e.g. the position and/or orientation of the illumination source relative to the user(s). For instance, if near the user and the pixelated lighting device is large or long, the spatial dimming may start on the lighting nodes which are further away from the user.

In embodiments, the illumination source may have a configurable size and/or shape, and said property may comprise the size and/or shape of the illumination source. For instance, the illumination source may comprise a lighting strip, the light-emitting elements being mounted on a strip that can be cut to a desired length by a user or even extended by the user, and/or that is flexible so that it can conform to a contour; and said property may comprise the length and/or contour of the strip In embodiments, the illumination source may take the form of a lamp for installation into a luminaire, and said property may comprise a property of the luminaire in which the lamp is installed. For instance said property may comprise a size and/or shape of the luminaire. As another example, said property may relate to an optical path between the light-emitting elements and the environment, the optical path being due to the luminaire. E.g. said property may comprise whether or not the luminaire has a diffuser between the light-emitting elements and the environment.

In embodiments, the light-emitting elements may be individually addressable. In embodiments, said property may comprise: whether or not the illumination source is installed in a luminaire along with another illumination source that does not comprises multiple individually addressable-light emitting elements.

Note also that the term "array" as used herein does not necessarily limit to a regular array such as a regular grid (though that is certainly one possible implementation). In general an array may refer to any group of light-emitting elements in any regular or irregular distribution.

According to another aspect disclosed herein, there is provided control equipment comprising: a controller for controlling an illumination source comprising an array of light-emitting elements for emitting illumination to illuminate an environment; and an input for receiving a dimming signal; wherein the controller is configured to control the illumination emitted by different ones of the light-emitting elements so as to form a spatial pattern, and to vary the spatial pattern according to a spatial dimming function whereby the spatial pattern is varied so as to emit a different overall intensity level as a function of a received dimming signal; and wherein the controller is further configured to determine a value of at least one property relating to a manner in which the illumination source is disposed, and to automatically set the spatial dimming function in dependence on the value of said property.

According to another aspect disclosed herein, there is provided a computer program product for controlling an illumination source comprising an array of light-emitting elements for emitting illumination to illuminate an environment, the computer program product comprising code embodied on a computer-readable storage and configured so as when run on one or more processing units to perform operations of: controlling the illumination emitted by different ones of the light-emitting elements so as to form a spatial pattern, and to vary the spatial pattern according to a spatial dimming function whereby the spatial pattern is varied so as to emit a different overall intensity level as a function of a received dimming signal; determining a value of at least one property relating to a manner in which the illumination source is disposed; and automatically setting the spatial dimming function in dependence on the value of said property.

In embodiments, the controller or computer program product may be further configured to perform operations in accordance with any of the method steps disclosed above.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
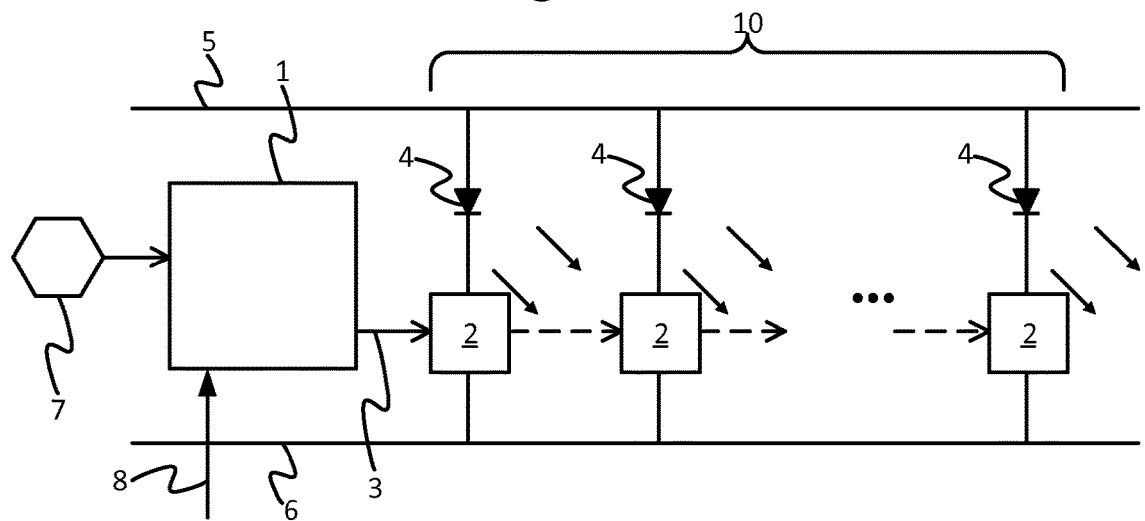
FIG. 1 is a schematic diagram of an illumination source and its controller.

As discussed above, due to various factors the dimming of an illumination source might be limited to a certain resolution. The following discloses a system and method which uses spatial dimming of an array of light-emitting elements to achieve "deep dimming" whereby the steps in overall illumination are finer than the dimming resolution of any given one of the light-emitting elements (e.g. LEDs). Deep dimming levels may be desirable for a number of reasons, such as to enable lighting devices to create light effects at a very low light intensity. This can enable a very subtle and gentle fade-in and out light effects which are pleasant to experience, such as to optimally support circadian lighting patterns, or to enable night light or orientation light providing a minimal amount of light in an area in order to facilitate orientation at night. For example deep dimming may be used to provide a gentle and smooth wake-up experience. Otherwise if the minimum dimming level is too high, a wake-up may be triggered immediately when switching on the lights to the first, lowest non-zero level.

Perceptual experiments show that good wake-up experience requires dimming with equivalent resolution of more than 14-bits. When employing LEDs as a light source, typical dimming resolution is 8, 12 or 16-bits. While 16-bits dimming resolution suits the requirement for wake-up experience, 8-bit is insufficient and 12-bit is just not enough. Even in case 16-bit dimming resolution is supported, this might not be good enough, e.g. when the PWM LED driving frequency becomes too low such that visible flickering of the light results as a consequence.

Sometimes an increase in dimming resolution can be achieved by applying temporal dithering, which could contribute the equivalent of 1 or 2 additional bits of dimming resolution. This should be enough for the wake-up experience, but it also imposes onerous requirements on the light controller: it will need two or four times faster addressing of the light drivers (for 1 or 2 bits of resolution increase respectively), and will also need the controller to act at regular time intervals (which can be challenging due to other tasks that the same controller executes). This may also require an update to the lighting controller's driver if implemented in a pre-existing system. It would therefore be desirable to provide an alternative way of refining the dimming resolution.

An alternative that does not necessarily require any kind of increase in the light controller addressing speed, is to use spatial dimming whereby different ones of the light-emitting elements in an array are individually controlled so as between them to form a pattern that varies as a function of the dim level, such that the overall intensity of the pattern varies as a function of the dim level. Thus spatial dimming enables finer dimming resolution. Further, to implement spatial dimming at the lowest end of the dimming range merely requires the adding of new spatial patterns in the controller, and so does not require an increase in addressing speed.

FIG. 1 shows an example implementation of a system for spatial dimming. The system comprises a regular or irregular array of light-emitting elements 4 each arranged to be driven by an individual respective driver 2. For example each of the light-emitting elements 4 may be connected in parallel with one another between a first power rail 5 and a second power rail 6 (e.g. ground), and each of the light-emitting elements 4 may be connected in series with its respective driver 2. The light-emitting elements 4 together form the illumination generating part of an illumination source 10 suitable for emitting light for illuminating an environment such as a room, to allow a person to see within the environment. In embodiments each of the light-emitting elements 4 takes the form of a respective LED or a respective group of LEDs (e.g. a respective string of LEDs in series). The illumination source 10 may take the form of a luminaire or a lamp for fitting into a luminaire (a luminaire being an illumination device comprising a lamp plus any associated housing, socket and/or support).

The system further comprises a controller 1 arranged to receive a dimming signal 8 indicative of a specified dimming level to be implemented by the controller 1 through the illumination source 10. The dimming signal may be specified by a user or by an automated function. The controller 1 is coupled to the driver 2 of each of the light-emitting elements 4, and is arranged to be able to independently address each of the drivers 2 and thereby control the individual output illumination level of each respective one of the light-emitting elements 4. In embodiments, as well as the ability to individually turn each light-emitting 4 element on and off, the drivers 2 allow the possibility of individually dimming the respective light-emitting elements 4, i.e. to control the individual light output level to take a range of different values between on and off. E.g. this may be implemented by controlling the magnitude of the current flowing through the respective light-emitting element 4, or by controlling the average current by means of pulse width modulation (PWM).

Based on the ability to individually control the light-emitting elements 4, the controller 1 is arranged to implement a spatial dimming function whereby it controls different ones of the light-emitting elements 4 differently as a function of the specified dimming level indicated in the input dimming signal 8, in order to vary the overall output illumination level in accordance with the dimming signal 8. Over some or all of the dimming range, the spatial dimming function may comprise a pure spatial dimming whereby only a subset of the light-emitting elements 4 are turned on at any given time and all the others are turned off, and dimming is implemented only by varying the number of light-emitting elements in the subset (i.e. varying the number that are turned on) as a function of the dimming signal 8. Alternatively or additionally, over some or all of the dimming range the dimming function may comprise a combination of spatial and intensity dimming whereby, as a function of the dimming signal, both: (a) the intensity of one or more of the light-emitting elements is varied, and also (b) the number of the light-emitting elements 4 that are turned on is varied and/or the intensities of multiple different ones of the light-emitting elements 4 are varied differently.

The system further comprises an input device 7 coupled to the controller 1. The input device 7 is arranged to provide the controller 1 with an input signal indicative of a manner in which the illumination source 10 is installed. There are a number of possibilities for this as will be discussed in more detail later, e.g. the position and/or orientation of the illumination source 10 in the room, the nature of the fixture, etc. Such information may be input manually by a user, in which case the input device 7 represents a user input device such as a desktop computer, laptop computer, tablet, smartphone or smartwatch. Alternatively the user input device 7 may be a sensing device comprising one or more sensors arranged to automatically sense the information on the manner of installation, and to supply this to the controller 1 automatically. Again, examples will be discussed in more detail later.

In operation, the controller 1 receives the input information from the input device 7 and uses this to adapt the spatial dimming function in dependence on the indicated manner in which the illumination source 10 is installed. Thus if the illumination source 10 is installed in one way (e.g. at a first position, in a first orientation or in a first type of fixture), the controller 1 controls the spatial pattern formed by the different light-emitting elements 4 to vary as a first function of the received dimming signal 8; whereas if the illumination source 10 is installed in another way (e.g. at a second position, in a second orientation or in a second type of fixture), the controller 1 controls the spatial pattern formed by the different light-emitting elements 4 to vary as a second function of the received dimming signal 8. This setting of the dimming function based on the installation may be performed manually by a user (e.g. a commissioning technician) via a manual input device 7, or the setting of the dimming function based on the installation may be performed automatically by the controller 1 based on either the manually input property or an automatically detected installation property sensed by a sensing unit 7. Further, the setting of the dimming function based on the installation may be performed as a preliminary commissioning step upon commissioning of the lighting system in which the illumination source 10 is installed, prior to an operational phase of the system; and/or the setting of the dimming function may be performed during an operational phase after commissioning (e.g. someone moves the illumination source to a new position or fixture and the controller 1 automatically updates the dimming function to adapt to the new installation based on the input from the sensor 7).

The controller 1 may be implemented in software stored on a memory and arranged to run on a processor. The memory on which the software is stored may comprise one or more memory units employing one or more storage media such as an electronic storage medium (e.g. EEPROM or "flash" memory) or a magnetic storage medium (e.g. a hard disk). The processing apparatus on which the software is arranged to run may comprise a single processor or multiple processors arranged to operate as a distributed processing system. In alternative embodiments it is not excluded that the controller 1 may be implemented in the form of dedicated hardware circuitry, or configurable or reconfigurable hardware circuitry such as a PGA (programmable gate array) or FPGA (field programmable gate array), or in any combination of hardware and software.

In embodiments the controller 1 may be implemented in the illumination source 10 itself, i.e. in the luminaire or even in the lamp, e.g. in the form of software stored on an embedded memory of the luminaire or lamp and arranged to run on an embedded microprocessor of the luminaire or lamp. In this case for example, the microcontroller may be connected to the same ground rail 6 as the light-emitting elements 4.

In alternative embodiments however the controller 1 may be external to the illumination source 10. For instance the controller 1 may be implemented as a lighting control application (or "app") running on a user terminal such as a desktop computer, laptop computer, tablet, smartphone or smart watch. As another example the controller 1 may be implemented as software running on a server (the server comprising one or more server units located at one or more geographical sites). As another example the controller 1 may be implemented on a lighting bridge which acts as an intermediate network node between the illumination source 10 and a lighting control application running on a user terminal for controlling the illumination source 10 via the bridge.

In embodiments where the controller 1 may be external to the illumination source 10, then in order to control the light-emitting elements 4 of the illumination source for the presently-disclosed purposes, the controller 1 may be arranged to control the drivers 2 of the light-emitting elements 4 via any suitable wired and/or wireless communications channel. For instance the controller 1 may connect to the illumination source 10 via a wired network such as an Ethernet network, a DMX network, or the Internet. As another example, the controller 1 may connect to the illumination source via a local RF (radio frequency) connection such as a Wi-Fi, ZigBee, Bluetooth, or Thread connection; or via a wireless network using a local (sort range) RF technology such as Wi-Fi, ZigBee, Bluetooth, or Thread or a wide area RF technology such as mobile cellular network (e.g. 3GPP network). The connection may also be via a combination of such means. E.g. the controller 1 may be implemented on a server and connect to the illumination source 10 via a first leg over the Internet and a second leg via a local wires technology such as Wi-Fi or the like. Or the controller 1 may be implemented in an application running on a user terminal such as a tablet, smartphone or the like, and may connect to the illumination source 10 via a first leg established with a lighting bridge using a first wireless technology such as Wi-Fi and then on from the bridge to the illumination source 10 using a second wireless technology such as ZigBee.

Wherever implemented, the controller 1 may be arranged to receive the dimming signal 8 from any of a number of possible sources, e.g. from a wireless "smart" wall switch; or from an application running on a user terminal such as a desktop computer, laptop, tablet, smartphone or smartwatch; or from an automated lighting controller implemented on a centralized device such as the bridge, server or a building controller. The dimming signal may originate from the same device as that on which the controller 1 is implemented. E.g. the controller 1 may be implemented on a server or in a lighting control application on a user terminal, and the dimming signal may originate from a control function implemented on the server or control application respectively. Alternatively the dimming signal may originate from a different device, in which case the signal may be received using any wired or wireless networking technologies such as those mentioned above. E.g. the controller may be implemented on a server or in the illumination source 10, and the dimming signal may originate from a wireless smart switch or a lighting control application running on a user terminal. Either way the dimming signal may be generated by an automated control function or based on a manual user input.

Similarly the input device 7 for supplying the information on the installation of the illumination source 10 may be implemented on the same device as the controller 1 or a different device. For example the controller 1 may be implemented in the illumination source 10 itself along with an input device 7 in the form of a sensor unit. Or as another example, the controller 1 may be implemented on a user terminal along with an input device 7 in the form of a user interface. Or as another example, the controller 1 may be implemented in the illumination source 10 or on a server, while the input device 7 may be implemented elsewhere, such as in the form of an external sensor, or a user interface of a user terminal such as a desktop computer, laptop, tablet, smartphone, smartwatch or wall panel. Where communication between the input device 7 and controller 1 is required, again any of the above-mentioned wired or wireless networking options may be employed, or others.

It will be appreciated that the above options are not exhaustive. A skilled person will be familiar with various ways of implementing a lighting controller 1, and various techniques for communicating between a controller 1 and an illumination source 10, and between a controller 1 and various sources of a dimming signal and various means of inputting other information.

In an example application of the techniques disclosed herein, the illumination source 10 may take the form of a linear LED lighting device such as a flexible LED strip with individually controllable LED nodes 4. Such devices are often used in situations where a deep dimming levels are desired, enabling the creation of a light effect with a low light intensity to optimally support night and orientation lights, or fading light effects such as a fade-out upon switching the light off when going to sleep, or a fade-in effect for a gentle wake up light experience.

More and more linear LED lighting devices have a high number of LED nodes 4, due to the decreasing costs of LEDs in combination with the need to create more sophisticated lighting patterns. If all those LED nodes are activated at their lowest intensity level, the total light output generated exceeds typical "deep dimming" levels.

Embodiments disclosed herein provide a spatial dimming mechanism for an illumination source 10 such as a linear lighting device with a multitude of individually addressable LED nodes 4, by activating only a subset of the lighting nodes 4. In some embodiments spatial dimming is applied in such a way that a homogeneous light effect is maintained over the linear lighting device while dimming, by ensuring an optimal linear distribution of the active number of LED nodes over the length of the strip.

It is also possible that the linear lighting device is built up from multiple constituent linear lighting devices (e.g. an extendable, pixelated LED strip). In this case, the configuration of the individual lighting devices can be known (e.g. orientation and connection to neighbouring devices) such that the resulting linear lighting device can be controlled as a single device. By doing this, the spatial distribution of the active lighting nodes 4 during spatial dimming can be optimized for the detected configuration of the individual LED lighting devices.

When only some of a set of individually addressable lighting elements (lighting nodes) 4 are turned on, the total amount of light is reduced with respect to the situation when all the individual lighting elements 4 are turned on. This is an example of spatial dimming.

Figure 2:
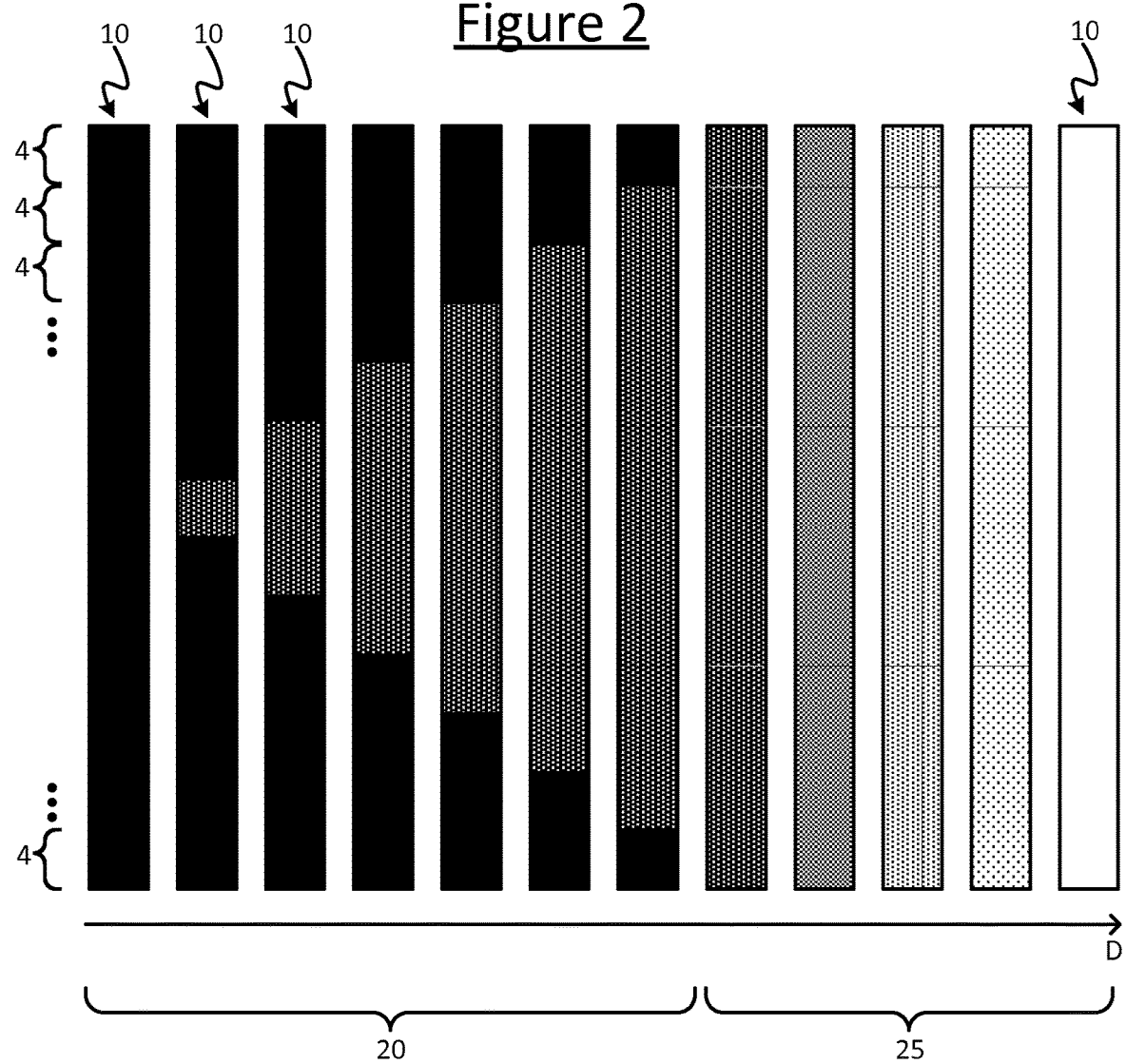
FIG. 2 is a schematic illustration of a spatial dimming function.

FIG. 2 illustrates the combination of spatial and intensity dimming for a pixelated light strip 10, but the same methods can be applied to any other pixelated light source form-factor. From the left to the right of the page, the figure shows the same light source 10 at different values of the input dimming level D as indicated in the dimming signal, e.g. as the input dimming level D increases with time. The dimming function comprises two phases: in a first range of the input diming signal D, a pure spatial dimming phase 20 in which only spatial dimming is used to increase the overall intensity of the illumination source 10; and in a second range of the input dimming signal D, a hybrid phase 25 which combines spatial and intensity dimming. In the pure spatial dimming phase 20, starting from the all individual lighting elements 4 being turned off (on the left side of input dim level axis D), first a small number of the lighting elements 4 are turned on, and gradually, as the dim level D increases, more and more lighting elements 4 are turned on. Once all the lighting elements 4 are turned on, the dimming function enters the second phase 25 where the intensity of all the lighting elements 4 is increased with the input dim level D. This example has a clear distinction between spatial and intensity dimming.

It is possible to apply spatial dimming throughout the full dimming range of a light-emitting element 4 (e.g. [0-255] for a dimming scale with 8-bit resolution), or to apply it over only part of the dimming range (e.g. [0-20]). In the simplest form the dimming can be a specific transition from the off state to the lowest intensity dimming level on state, or equivalently from dim level 0 (off) to dim level 1 (lowest intensity dim level). This could be a fixed transition, hard-coded in the pixelated light source controller 1 or something which can be programmed to the controller 1 from other parts of the connected lighting system, e.g. a bridge, app or server. In embodiments it can also be controlled on-the-fly by means of controlling each pixel 4 separately.

Figure 3:
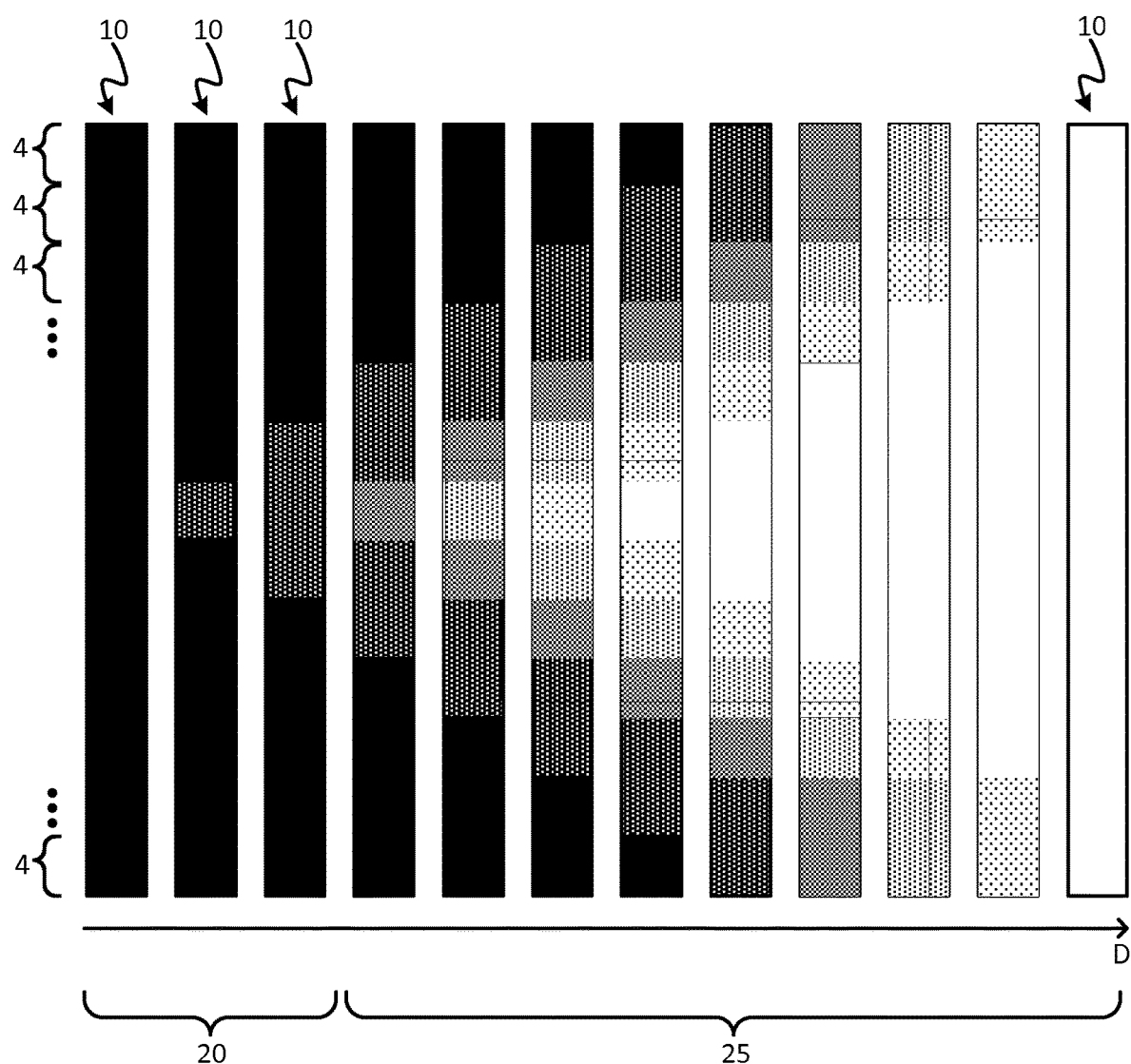
FIG. 3 is a schematic illustration of another spatial dimming function.

Another possible way of combining spatial with intensity dimming is shown in FIG. 3. Here, starting with spatial dimming only 20, after a couple of individual lighting elements 4 are turned on, intensity dimming 25 is also applied on certain ones of the lighting elements 4. In this way spatial dimming is combined at the same time as intensity dimming.

Figure 4:
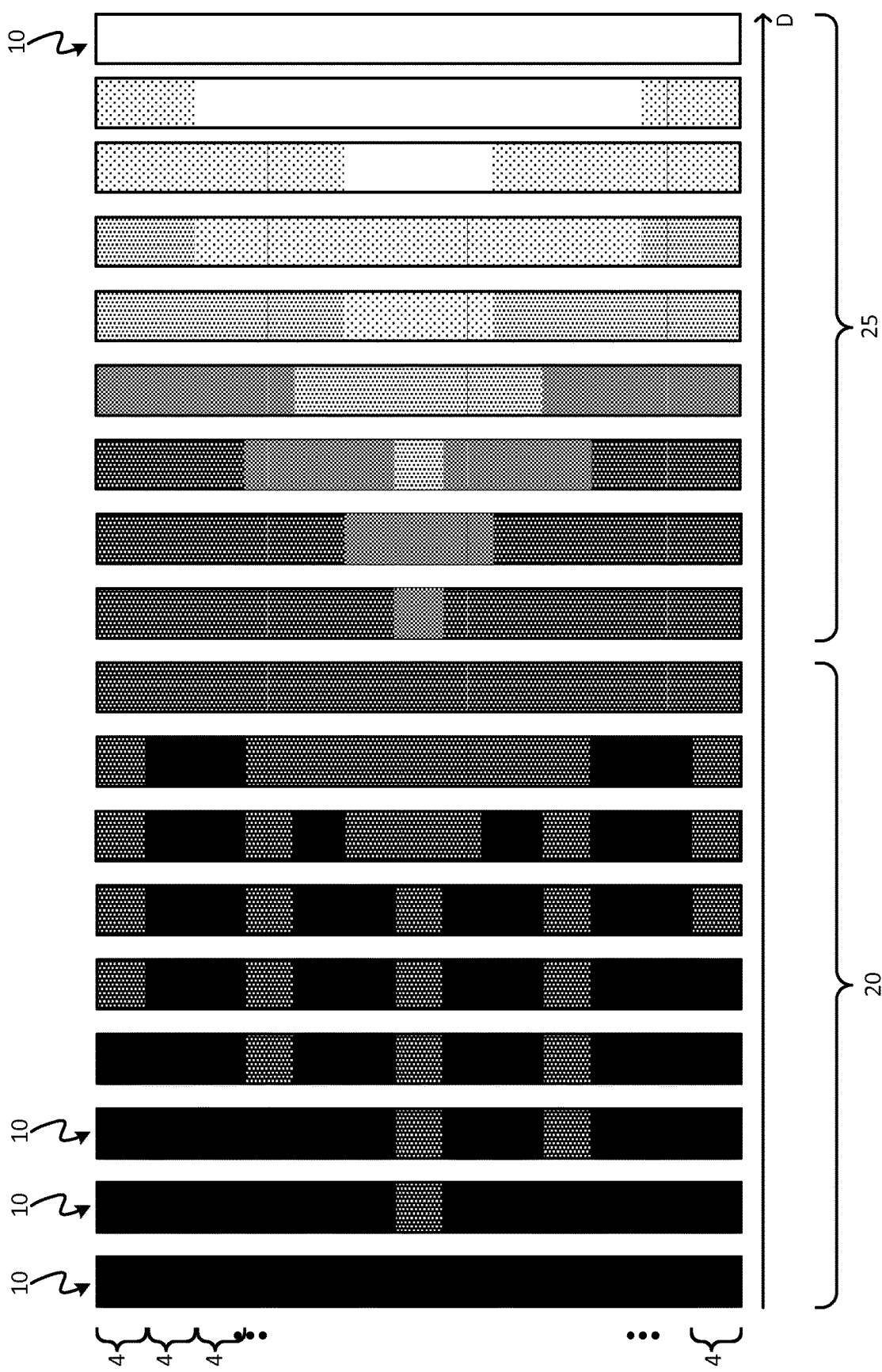
FIG. 4 is a schematic illustration of another spatial dimming function.
Figure 5:
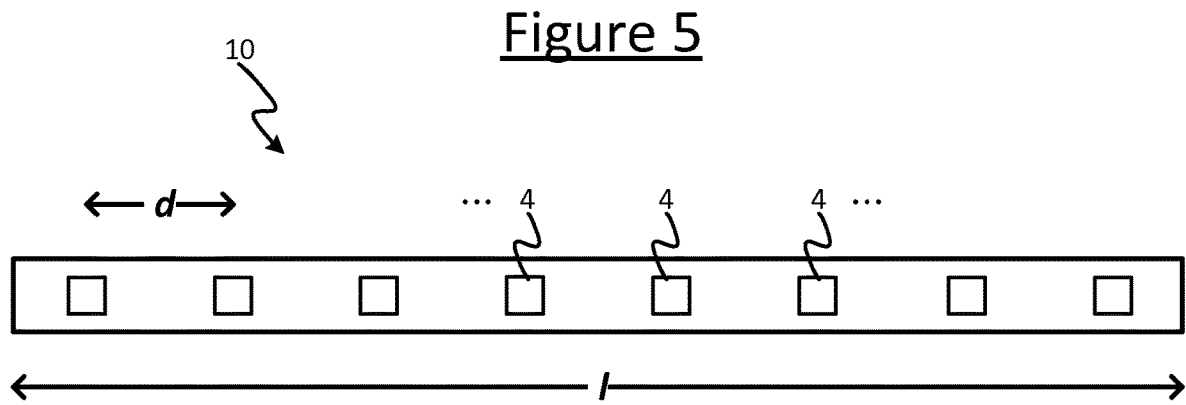
FIG. 5 is a schematic illustration of a lighting strip.

Other combinations of spatial and intensity dimming are also possible, with different spatial patterns. Another example is given in FIG. 4. FIG. 5 illustrates an example of some factors which may affect the design of the spatial dimming pattern for a linear array of light-emitting nodes 4. The spatial dimming pattern may depend on the following parameters: (i) length l of the LED array, (ii) LED pitch d; and (iii) mint, the lowest dimming level achieved by non-spatial dimming. This dependency can be written in the following way:

$$\text{dim\_pattern} = f(1, d, \text{minL})$$

In a simplified implementation the spatial dimming pattern may be a function of a subset of the parameters listed above, for example only a function of length of LED array and lowest dimming level.

Although the examples given above focus on a one-dimensional linear LED array, similar principles can be applied to 2D (or even 3D) LED arrays. For many applications it would be beneficial to create patterns which achieve a homogeneous, uniform lighting effect. This requires a uniform distribution of active lighting nodes 4 over the entire array at every dim level, and optionally gradual transitions between those dim levels such that changes in the spatial light pattern are not noticeable.

Some examples are now described as to how the spatial dimming function may be adapted in dependence on a property of the installation of the illumination source 10.

In a first class of embodiments, the spatial dimming function may be selected in dependence on an optical path surrounding the array of light-emitting elements 4. Two different examples are illustrated in FIGS. 6a and 6b.

In both cases the illumination source 10 takes the form of a lamp to be connected into a luminaire (light fixture). The lamp 10 comprises a lamp casing 30 through which the illumination from the light-emitting elements 4 is emitted into the environment, e.g. a transparent, translucent or diffusive casing. The lamp 10 may for example take the form of a retrofittable LED-based replacement for a fluorescent tube, e.g. a so-called TLED (Tube-LED).

Figure 6A:
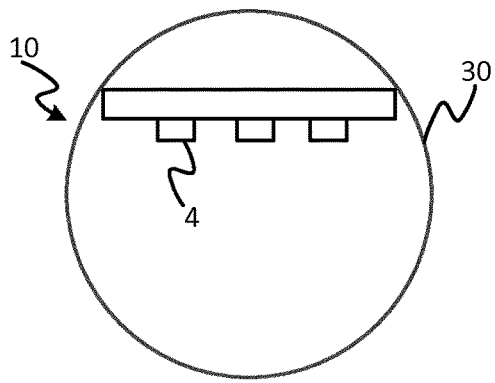
FIG. 6a is a schematic illustration of a lamp.

In the case of FIG. 6a, the light-emitting elements 4 (e.g. LEDs) are only surrounded by the lamp casing 30, for example because the luminaire into which the lamp 10 is connected comprises no diffuser of its own and instead reveals the lamp 10 directly to the illuminated environment (e.g. having no housing between the lamp 10 and the environment or only a transparent part of its housing between the lamp 10 and the environment). Although the lamp casing 30 is typically of a diffuse type, the distance between the light-emitting elements 4 and the lamp casing 30 is small, and hence the light-emitting elements 4 (e.g. LEDs) are still visible individually. Therefore for such a scenario, in embodiments a spatial dimming pattern may be selected with a graceful and appealing property, for example starting in the middle and then growing slowly on both sides, e.g. turning on every second or third light-emitting element 4 until the ends are reached, and then turning on the light-emitting elements 4 in between in similar manner.

Figure 6B:
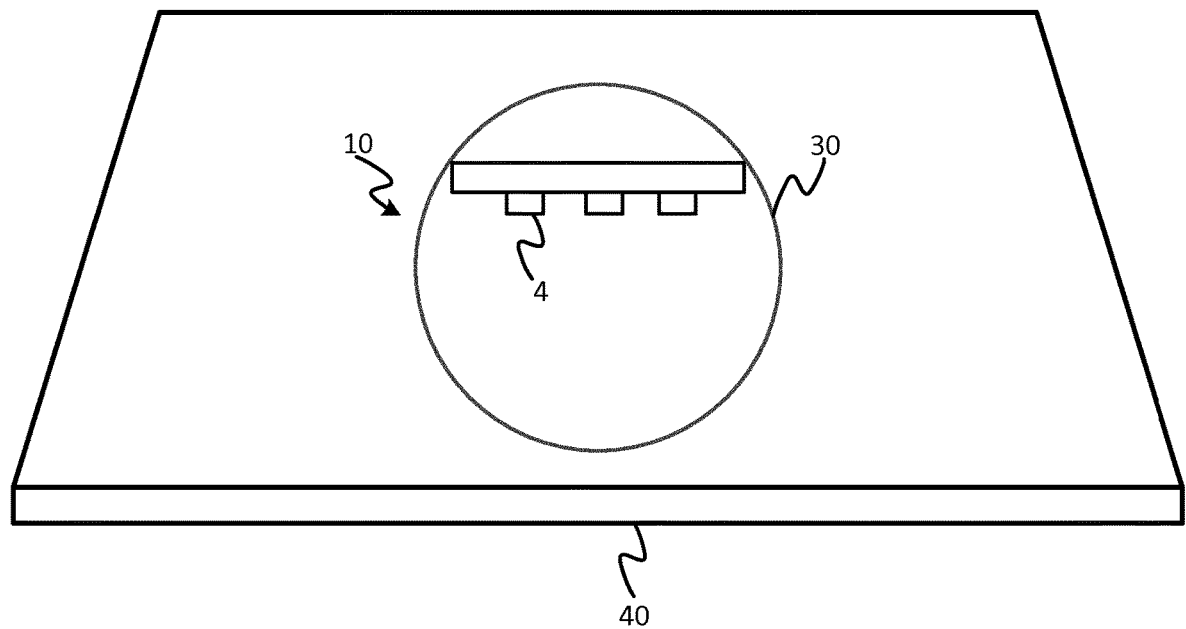
FIG. 6b is a schematic illustration of a lamp behind a diffuser.

In the case of FIG. 6b on the other hand, the same lamp 10 is connected into a luminaire with an additional diffuser 40 arranged between the lamp 10 and the environment being illuminated. In this case the individual light-emitting elements 4 are much less visible, and hence the spatial dimming pattern need not be so strict. For example, a dimming function may be selected whereby the light-emitting elements 4 are switched in random order.

Figure 7A:
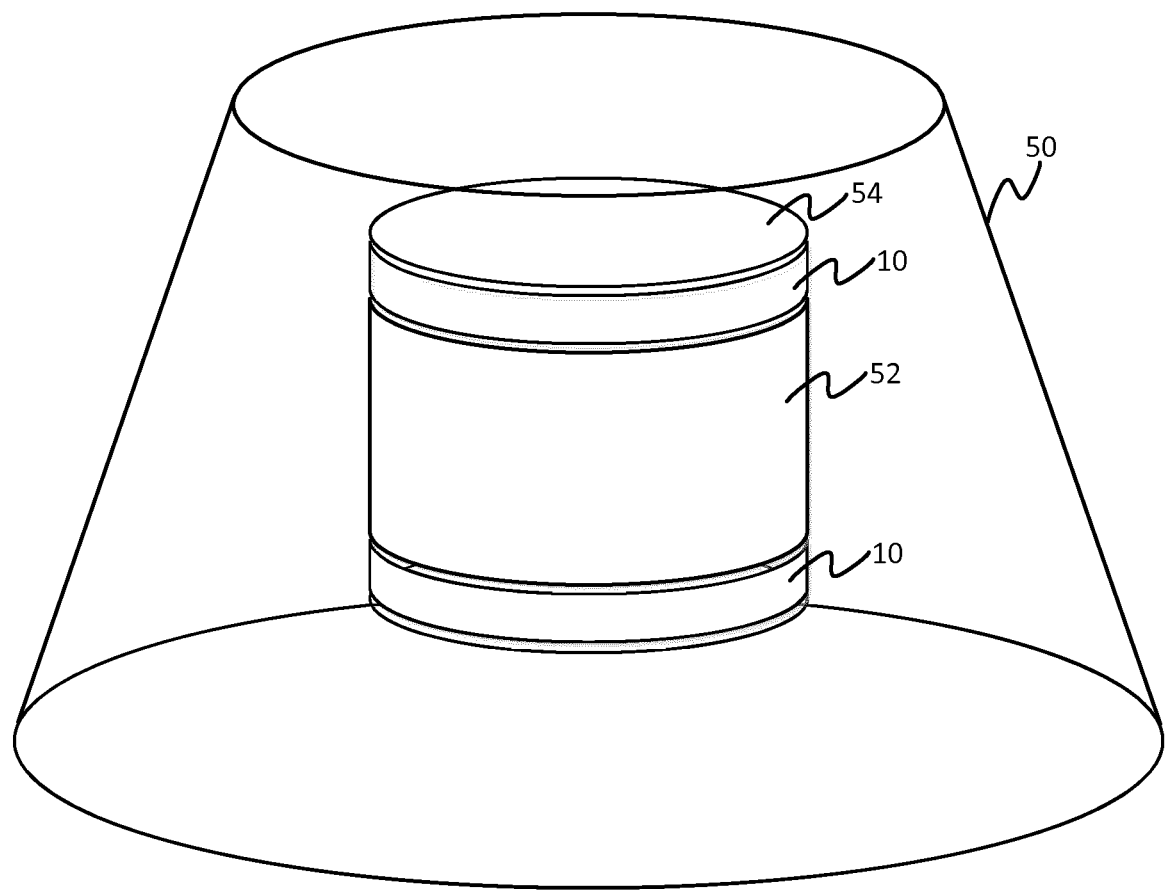
FIG. 7a is a schematic illustration of a lamp inside a luminaire.
Figure 7B:
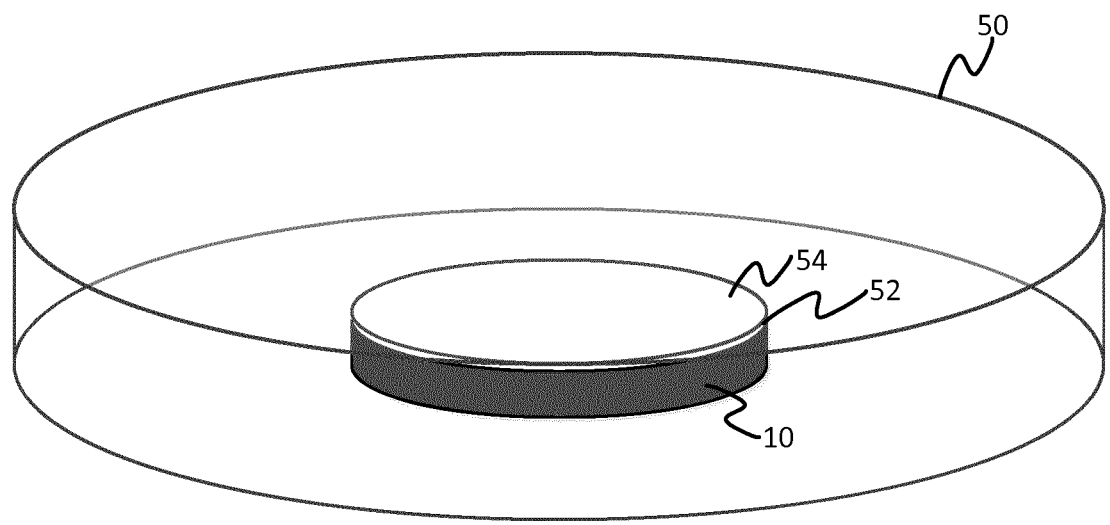
FIG. 7b is a schematic illustration of a lamp in another luminaire.

Another example is illustrated in FIGS. 7a and 7b. Here the optical path is partially blocked by a lampshade 50 of the luminaire. E.g. the illumination source 10 may take the form of an LED array mounted on a cylinder 52 inside the lampshade 50. Spatial dimming is not so critical in this case, because individual LED nodes 4 are not easily visible. Hence in embodiments, the spatial dimming function may depend on whether the lamp 10 is installed in a luminaire that comprises a lampshade or no lampshade. And/or, the spatial dimming function may be selected in dependence on a shape of the lampshade, which will block the optical path in different ways and to different extents depending on the shape.

An indication of the optical path (e.g. in terms of a property of the luminaire affecting the optical path) could be input manually by a user through a manual input device 7. E.g. the user may input an indication of the type or identity of the luminaire in which the lamp 10 is installed, and the controller 1 may automatically determine from this whether that lamp or type of lamp comprises a diffuser, or whether it comprises a lampshade, and/or a size and/or shape of the diffuser, lampshade or housing. Or else the user may simply manually enter an indication as to whether or not the luminaire comprises a diffuser, or whether or not it comprises a lampshade, or may manually enter an indication of a size and/or shape of the luminaire housing. In alternative approaches the input device 7 may take the form of a sensor module comprising one or more sensors for automatically detecting the optical path or a property of the luminaire affecting the optical path. E.g. the sensor module 7 may comprise a near-field communication (NFC) reader such as an RF tag reader included in the lamp 10, arranged to automatically read a type or identity of the luminaire or luminaire housing from a corresponding NFC output component, e.g. RF tag, in the luminaire. Or a similar solution can be implemented where the sensor module 7 takes the form of any other type of data connection with the luminaire for receiving an indication of the type or identify of the luminaire or luminaire housing. Or as another example, the sensor module may comprise an optical ranging sensor arranged to automatically sense the optical path.

Either way, whether the indication is input manually or detected automatically, the controller 1 may be configured to automatically adapt the spatial dimming function in dependence on the received indication of the optical path. Alternatively the selection of the spatial dimming function in dependence on the optical path may be performed manually by a commissioning technician upon installation and commissioning of the illumination source 10.

In a second class of embodiments, the illumination source 10 may have a configurable size and/or shape, and the spatial dimming function may be selected in dependence on this size and/or shape.

An example is a "cut-to-measure" LED strip, wherein the illumination source 10 takes the form of a strip of flexible material with the light-emitting elements 4 (in the form of LEDs) mounted along its length, and wherein the strip can be cut to a desired length by a user for use in a desired application. Alternatively or additionally, the user may be able to extend the length of the LED strip by connecting it together with one or more other such strips (which may or may not themselves be cut to length). In this case the spatial dimming function may be selected in accordance with the cut or extended length of the LED strip, which may be measured in terms of how many of the LED nodes 4 in the strip are active.

The controller 1 may be configured to take into account an input regarding the operational set of LED nodes 4 when applying light pattern effects, and also when applying spatial dimming. Such an input regarding the active length or active LED nodes of the LED strip could be detected automatically. In this case the input device 7 comprises a means for measuring the active length of the strip. For example, in embodiments the LED strip is configured to be able to receive data messages input to the LED node 4 at one end of the strip (e.g. input by the controller 1), with each LED node 4 comprising a data buffer which relays the message along to the next node the in the linear array. In such cases, the active length can be measured by sending a message along the length of the strip and measuring a time delay for the message to reach the other end, or to be echoed back along the strip from the last node 4 at the other end. Another way of measuring the length of an LED strip or the like is to measure the power drawn by all the LEDs in the strip, as the power will increase with the number of nodes 4. A similar technique could be used to measure the size of other shapes of array in terms of the number of nodes in a 2D or 3D array (and note again that an array as referred to herein need not limit to a regularly spaced or formed array). As another option, the input device 7 may take the form of a camera and an image recognition algorithm may be applied to recognize the length of the strip, or more generally the size of the configurable illumination source 10. As yet another alternative, the input device 7 may comprise a manual input means for receiving a manually input indication of the length of the strip or more generally the size of the configurable illumination source 10.

Alternatively or additionally, the spatial dimming function may be selected in dependence on a shape which the flexible LED strip is arranged to conform to. E.g. the preferred pattern may be different depending on whether the strip is laid out straight or wrapped around an arc or cylindrical shaped element (e.g. see FIGS. 7a and 7b). A similar idea could be applied to adapt the spatial dimming pattern in dependence on the contour of a 2D sheet of LEDs. Again, such information could be input manually, or could be detected automatically, e.g. by means of a camera and image recognition algorithm.

The controller 1 may thus be configured to adapt the spatial dimming function in dependence on any such automatically detected or manually entered parameters relating to the size and/or shape of the illumination source 10. It is again also possible that such factors are taken into account by a commissioning technician when programming manually programming a spatial dimming function.

In a third class of embodiments, the spatial dimming function may be selected in dependence on whether the illumination source 10 is installed in conjunction with another illumination source, and if so what kind.

An example is illustrated in FIGS. 7a and 7b. Here the illumination source 10 takes the form of an LED strip of individually-addressable LED nodes 4, the strip being wrapped around a cylindrical element 52 of a luminaire. The luminaire may comprise a lampshade 50. By way of illustration FIG. 7a shows an example where two such LED strips 10 are included, whilst FIG. 7b shows and example where only one is used. The luminaire may also comprise another, different illumination source 54 which does not comprise multiple individually-addressable light-emitting elements 4 but rather whose illumination output is only controllable as an indivisible, unitary whole (e.g. it may comprise multiple light-emitting elements but which are not individually addressable, or it may simply comprise only one light-emitting element). The other light source 54 is therefore incapable of spatial dimming.

In embodiments, the spatial dimming function may be selected in dependence on whether or not the illumination source (or sources) 10 is installed in a luminaire along with another kind of illumination source 54 that does not comprise multiple individually-addressable light sources and therefore which is not capable of spatial dimming. For example, when a luminaire is realized as a combination of a first illumination source 10 comprising individually addressable LED nodes 4 and another source 54 comprising a number of non-individually addressable LED's, deep dimming may be implemented by first turning on the individually addressable LEDs 4 in the lower dimming range, then when a certain light level is achieved turning on the non-individually addressable LEDs 54.

The presence of the other kind of illumination source 54 may be detected automatically, e.g. the input device 7 comprising an NFC reader such as an RF tag reader for identifying the presence of the other kind of illumination source 54 from a corresponding NFC output element (such as an RF tag) included in the luminaire or in the other illumination source 54. A similar solution could also be achieved using any other communication means for reading data from the luminaire or other illumination source 54. Alternatively the input device 7 may comprise a manual input device enabling a user to indicate to the controller 1 manually whether or not the other kind of illumination source 54 is present.

Either way, whether input manually or automatically, the controller 1 may thus be configured to automatically adapt the spatial dimming pattern in dependence on whether or not another, non-spatially dimmable illumination source 54 is present in the same luminaire. Alternatively, it is again possible that a commissioning technician manually sets the spatial dimming pattern in dependence on this consideration.

In a fourth class of embodiments, the illumination source 10 may take the form of a lamp for connecting into a luminaire, and the spatial dimming function may be selected in dependence on the position and/or orientation of the lamp 10 relative to the luminaire in which it is installed.

Figure 8:
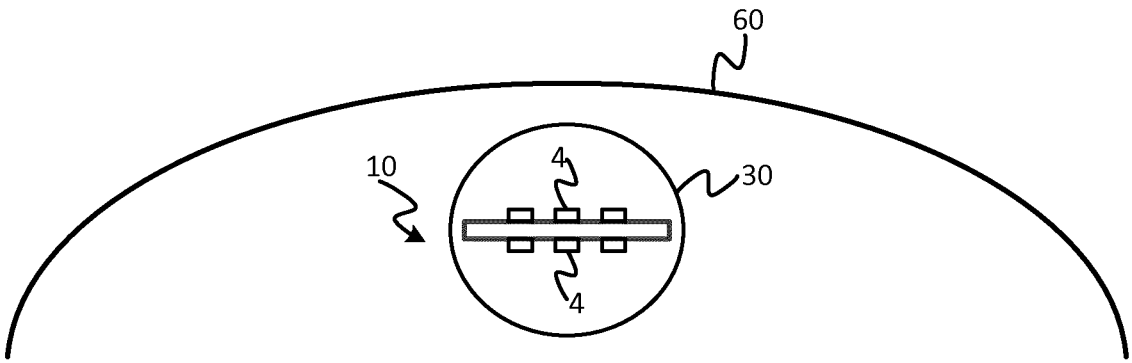
FIG. 8 is a schematic illustration of a lamp next to a reflector.

For instance, depending on its position and/or orientation in the luminaire, an LED array 10 can sometimes be directly visible to an observer, or sometimes not directly visible. Depending on the visibility of the LED array the spatial dimming pattern may have different requirements. As an illustration of this, FIG. 8 shows a double-sided TLED 10 mounted in a luminaire with a diffuse reflector 60. The LEDs 4 on bottom side are directly visible to an observer, so a spatial dimming function on this side may be selected to appeal to observer—for example, turning on first the LEDs in the middle and then adding LEDs on both sides as the dim level increases. The LEDs 4 on the top side on the other hand are not directly visible to observer, so the spatial dimming pattern on this side has less strict requirements.

Furthermore, in order to reduce the visibility of spatial-pattern, in this configuration, the dimming function can be selected such that the LEDs 4 on the invisible side are first used for lowest light levels, and then only when a certain light level is achieved at the invisible side, the function starts to turn on the LEDs 4 on the visible side.

More generally, the preferred spatial dimming function may depend on the position and/or orientation of the lamp 10 relative to any optical component of the luminaire such as a reflector 60 or diffuser, or relative to any other component affecting light propagation such as a lampshade 50 or an opaque housing. E.g. the spatial dimming function may be selected in dependence on how close the lamp 10 is to the reflector 60, diffuser 40, lampshade 50 or opaque housing; and/or how the lamp's light-emitting surface or surfaces are oriented relative to the reflector 60, diffuser 40, lampshade 50 or opaque housing.

The position and/or orientation may be detected automatically. For example the input device 7 may comprise a ranging sensor for detecting the distance of the lamp 10 from a surface of the luminaire, and/or a relative direction of that surface. The ranging sensor could be included in the lamp 10 or in the luminaire. And/or the input device 7 may comprise an orientation sensor such as an accelerometer, gyroscope or magnetometer for detecting the orientation of the lamp 10 relative to the luminaire (assuming the luminaire itself is in a known orientation relative to the earth). Alternatively the input device 7 may take the form of a manual input device allowing the user to enter information on the position and/or orientation relative to the luminaire manually. Either way, whether the input is automated or manual, the controller 1 may thus automatically adapt the spatial dimming function in dependence on the position and/or orientation of the lamp 10 relative to one or more components of the luminaire in which it is installed. Or again, alternatively the commissioning technician may take account of such information when manually setting the spatial dimming function.

In a fifth class of embodiments, the spatial dimming function may be selected in dependence on the position and/or orientation of the illumination source 10 relative to the environment in which it is deployed, e.g. relative to the room.

Figure 9:
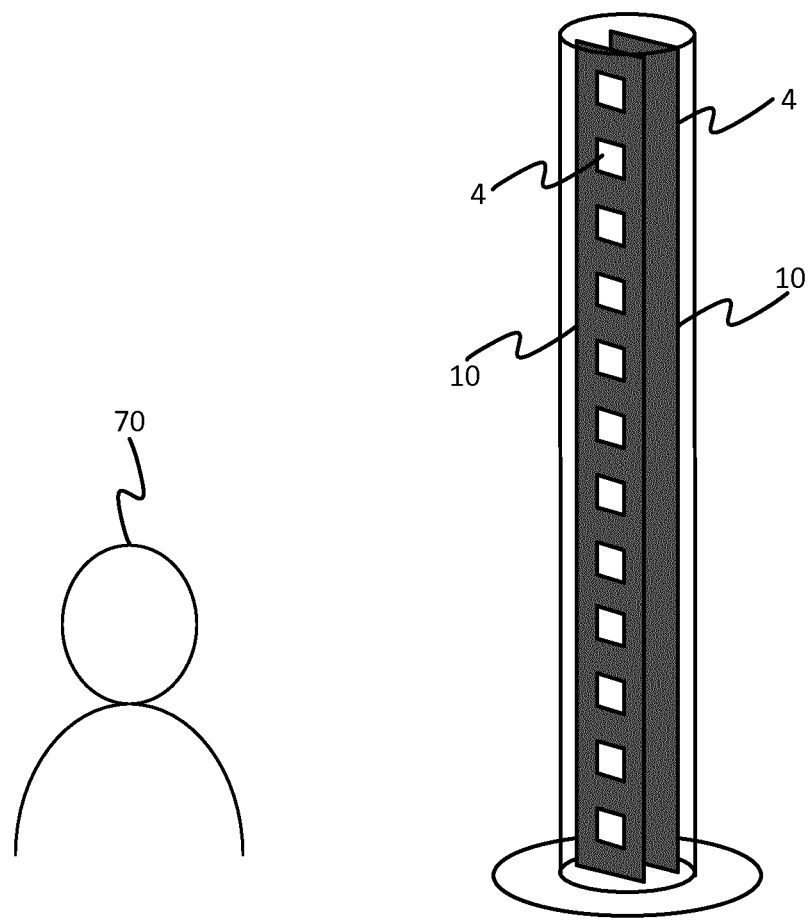
FIG. 9 is a schematic illustration showing the positioning of a luminaire.

For instance, FIG. 9 illustrates a kind of beam luminaire 10, with LEDs on two sides, where typically one side is visible to the observer 70 whilst the other side is not. The non-visible side may shine light toward a wall or a corner of a room. Here the spatial pattern on the non-visible side is much less critical. So for instance, the spatial dimming function may be chosen so as in the lower part of the dimming range to first turn on the LEDs 4 on the non-visible side of the luminaire, and then as the dim level increases to start turning on LEDs 4 on the visible side.

Figure 10A:
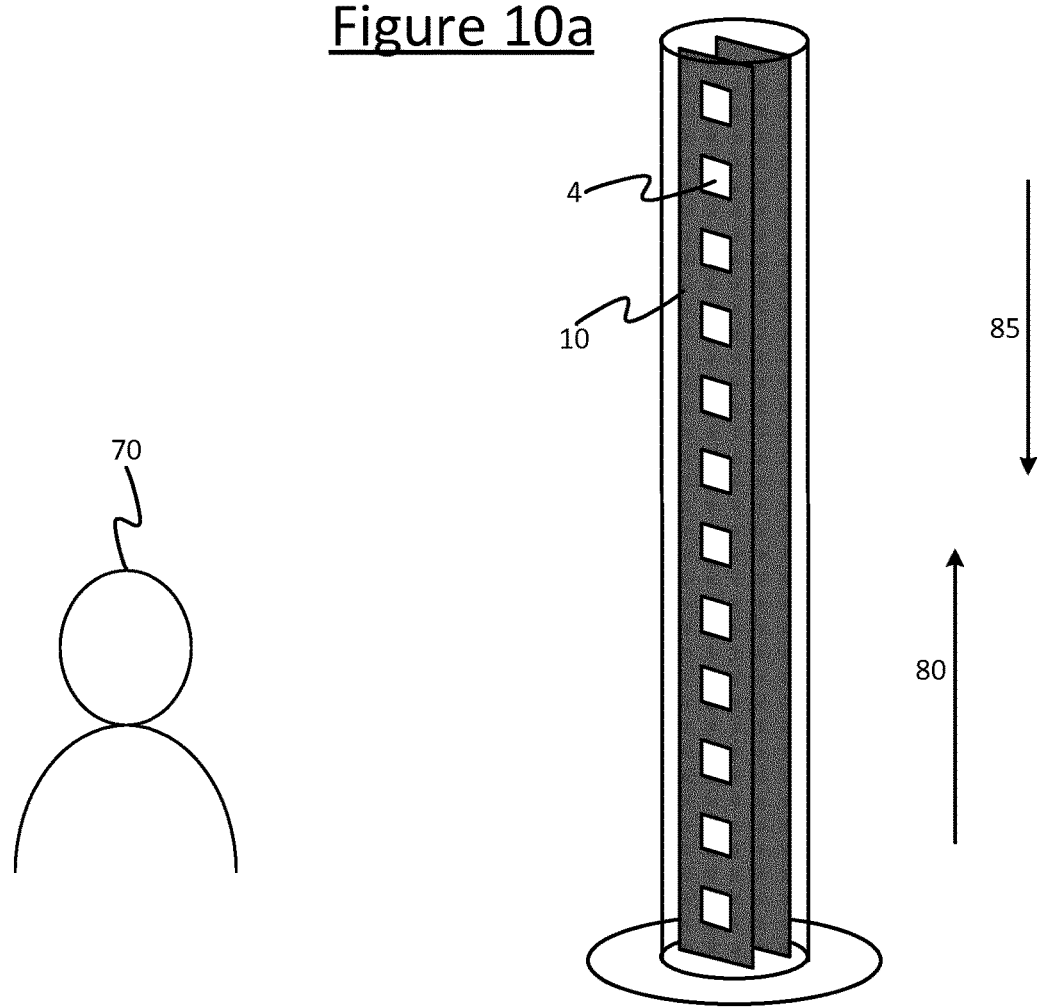
FIG. 10a is a schematic illustration of a luminaire orientation.
Figure 10B:
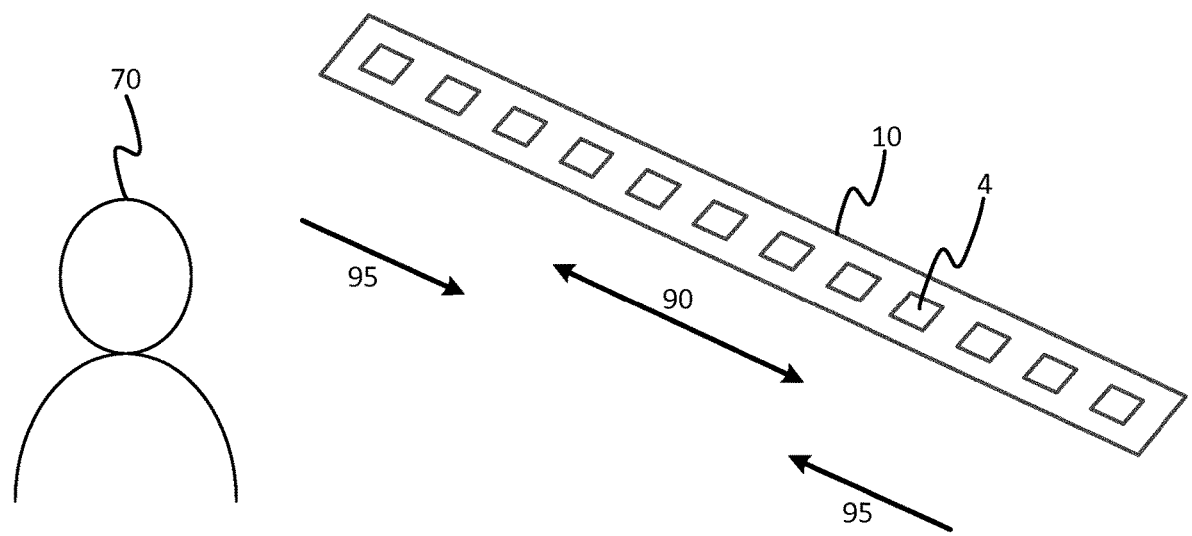
FIG. 10b is a schematic illustration of another luminaire orientation.

In general, there can often be a lot of freedom in mounting a LED array type of light source 10. E.g. a linear array of lighting nodes 4 may be mounted horizontally or vertically. Some examples of vertical and horizontal mounting are illustrated in FIG. 10. In embodiments the spatial dimming function may be selected in dependence on whether the linear array is placed horizontally or vertically. For instance, a horizontal mounted LED strip may have a specific spatial dimming function. E.g. at lower values of the dim range the pattern may start in the middle then spread outwards as the dim level increasers. Or the dimming for a horizontal array may use using a uniform, homogeneous distribution. Whereas a vertically mounted LED strip may use another spatial dimming pattern. E.g. when placed vertically, for lower values of the dim range the pattern may start at the bottom of the array, then slowly move upwards as the dim level increases.

As another example, the spatial dimming function may be selected in dependence on how close the illumination source 10 is to a wall, e.g. whether it is closer to a wall or whether it is closer to the middle of the room. For instance a spatial dimming function for an illumination source 10 next to a wall may be selected to be asymmetrical, e.g. so as to spread increasingly outwards from the wall as the dim level increases, whereas the spatial dimming function for an illumination source toward the middle of a room may be selected to be symmetrical about the centre of the array 4.

In other examples, the spatial dimming function may be dependent on the height of the illumination source 10 in the room (i.e. relative to the floor); whether or not the illumination source 10 is within a predetermined proximity of a portal such as an entrance or window; a placement type (e.g. floor standing, table top, wall-mounted, embedded, under-cabinet etc.); or and orientation in the room relative to magnetic north (e.g. to create a natural wake up light).

Again the position and/or orientation may be detected automatically. For example the input device 7 may comprise a ranging sensor for detecting the distance of the illumination source from a surface such as a wall, and/or for detecting a direction of the wall. The ranging sensor could be included in the illumination source 10 or in the environment. And/or the input device may comprise an orientation sensor included in the illumination source 10, such as an accelerometer, gyroscope or magnetometer. Alternatively the input device 7 may take the form of a manual input device allowing the user to enter information on the position and/or orientation information manually. Either way, whether the input is automated or manual, the controller 1 may thus automatically adapt the spatial dimming function in dependence on the position and/or orientation of the illumination source 10 relative to the environment in which it is installed (e.g. relative to one or more features of the room). Or again, alternatively the commissioning technician may take account of such information when manually setting the spatial dimming function.

Note: while the above has been described in terms of adapting the spatial dimming function in dependence on the manner in which the illumination source 10 is installed, the teachings herein are not limited to the case where the illumination source 10 is installed in its environment (i.e. fixed in place). More generally, the spatial dimming function may be selected in dependence on any indication of the manner in which the illumination source 10 is disposed within its environment.

For instance, in a sixth class of embodiments, the illumination source 10 may take the form of a non-fixed luminaire such as a portable luminaire; and the spatial dimming function may be selected in dependence on the position and/or orientation of the illumination source 10 relative to one or more users 70 (i.e. people in the environment). E.g. the illumination source 10 may take the form of a portable luminaire having an on-board power supply such as a battery or clockwork dynamo, such that the illumination source can be placed anywhere in the room. Or the illumination source may take the form of a free-standing luminaire that is powered by the mains but which can be positioned freely about the room, limited only by the length and flexibility of its power cable and the availability of power sockets around the room. In such cases, the spatial dimming function may depend on where the luminaire 10 is placed and/or how it is oriented relative to one or more users. For instance, the spatial dimming pattern may begin at the lower end of the dimming range by turning on or up only some of the light-emitting elements 4 that are further away from the user 70, then at the higher end of the dimming range turning on or up more of the light-emitting elements 4 closer to the user 70. Again the relative position and/or orientation could be input manually or sensed automatically, e.g. by one or more presence sensors to detect the position of the user 70 and indoor positioning network to detect the position of the illumination source, and/or an accelerometer, gyroscope or magnetometer to detect the orientation of the illumination source. And again the selection of the spatial dimming function may also be performed automatically or manually upon commissioning.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of controlling a linear lighting device comprising an array of light-emitting elements for emitting illumination to illuminate an environment, the method comprising:
   arranging a controller to control the illumination emitted by different ones of the light-emitting elements so as to form a spatial pattern, and to vary the spatial pattern according to dimming function comprising a spatial dimming function, whereby the spatial pattern is varied as to emit a different overall intensity level as a function of a receipt dimming signal;
   determining a value of at least one property relating to a manner in which the linear lighting device is deployed, said property comprising at least one of: a position and/or orientation of the linear lighting device relative to a reference point within the environment, and a size and/or shape of the linear lighting device or of a luminaire in which the linear lighting device is installed; and
   setting the dimming function in dependence on the value of said property, such that the linear lighting device produces a homogeneous light effect over the linear lighting device while dimming, by ensuring an uniform distribution of the illumination emitted by the light-emitting elements over the length of the linear lighting device.

2. The method of claim 1, wherein the determining of the value of said property comprises automatically detecting the value using at least one sensor.

3. The method of claim 1, wherein the determining of the value of said property comprises receiving a user input indicative of the value.

4. The method of claim 1 wherein the linear lighting device takes the form of a lamp for installation into a luminaire, and said property comprises a position and/or orientation of the lamp within the luminaire.

5. The method of claim 1, wherein said property comprises a location and/or orientation of the linear lighting device within the environment.

6. The method of claim 5, wherein the environment comprises a room and said property comprises the location and/or orientation of the linear lighting device within the room.

7. The method of claim 1, wherein the linear lighting device comprises a lighting strip, the light-emitting elements being mounted on a strip that can be cut to a desired length or extended by a user and/or that is flexible so that it can conform to a contour; and wherein said property comprises the length and/or contour of the strip.

8. The method of claim 1, wherein the linear lighting device the form of a lamp for installation into a luminaire, and said property comprises a property of the luminaire in which the lamp is installed.

9. The method of claim 8, wherein said property relates to an optical path between the light-emitting elements and the environment due to the luminaire.

10. The method of claim 9, wherein said property comprises whether or not the luminaire has a diffuser between the light-emitting elements and the environment.

11. The method of claim 8, wherein said property comprises a size and/or shape of the luminaire.

12. The method of claim 1, wherein said light-emitting elements are individually addressable, and wherein said property comprises: whether or not the linear lighting device is installed in a luminaire along with another linear lighting device that does comprise multiple individually addressable light-emitting elements.

13. The method of claim 1, wherein said property comprises: a position and/or orientation of the linear lighting device relative to one or more users.

14. Lighting control equipment comprising:
a controller for controlling a linear lighting device comprising an array of light-emitting elements for emitting illumination to illuminate an environment; and
an input for receiving a dimming signal;
wherein the controller is configured to control the illumination emitted by different ones of the light-emitting elements so as to form a spatial pattern, and to vary the spatial pattern according to a dimming function comprising a spatial dimming function, whereby the spatial pattern is varied so as to emit a different overall intensity level as a function of a received dimming signal; and
wherein the controller is further configured to determine a value of at least one property relating to a manner in which the linear lighting device is deployed, said property comprising at least one of: a position and/or orientation of the linear lighting device relative to a reference point within the environment, and a size and/or shape of the linear lighting device or of a luminaire in which the linear lighting device is installed; and to automatically set the dimming function in dependence on the value of said property, such that the linear lighting device produces a homogenous light effect over the linear lighting device while dimming, by ensuring an uniform distribution of the illumination emitted by the light-emitting elements over the length of the linear lighting device.

15. A computer program product for controlling a linear lighting device comprising an array of light-emitting elements for emitting illumination to illuminate an environment, the computer program product comprising code embodied on a computer-readable storage and configured so as when run on one or more processing units to perform operations of:
controlling the illumination emitted by different ones of the light-emitting elements so as to form a spatial pattern, and to vary the spatial pattern according to a dimming function comprising a spatial dimming function, whereby the spatial pattern is varied so as to emit a different overall intensity level as a function of a received dimming signal;
determining a value of at least one property relating to a manner in which the linear lighting device is deployed, said property comprising at least one of: a position and/or orientation of the linear lighting device relative to a reference point within the environment, and a size and/or shape of the linear lighting device or of a luminaire in which the linear lighting device is installed; and
automatically setting the dimming function in dependence on the value of said property, such that the linear lighting device produces a homogeneous light effect over the linear lighting device while dimming, by ensuring an uniform distribution of the illumination emitted by the light-emitting elements over the length of the linear lighting device.

16. The method of claim 1, wherein the dimming function comprises a first phase and a second phase, wherein the first phase applies the spatial dimming function and wherein the second phase applies an intensity dimming function that adjusts a dim level for the array of the light-emitting elements.

17. The lighting control equipment of claim 14, wherein the dimming function comprises a first phase and a second phase, wherein the first phase applies the spatial dimming function and wherein the second phase applies an intensity dimming function that adjusts a dim level for the array of the light-emitting elements.

18. The computer program product for controlling a linear lighting device of claim 15, wherein the dimming function comprises a first phase and a second phase, wherein the first phase applies the spatial dimming function and wherein the second phase applies an intensity dimming function that adjusts a dim level for the array of the light-emitting elements.

* * * * *